United States Patent

[11] 3,603,994

[72] Inventors Barry E. Williams
 Downey;
 Glenn B. Fitzpatrick, Anaheim, both of, Calif.
[21] Appl. No. 546,475
[22] Filed Apr. 26, 1966
[45] Patented Sept. 7, 1971
[73] Assignee Hughes Aircraft Company
 Culver City, Calif.

[54] SYSTEM FOR AUTOMATICALLY GENERATING SMOOTHING PARAMETERS IN AN AUTOMATIC TRACK-WHILE-SCAN RADAR SYSTEM
12 Claims, 12 Drawing Figs.

[52] U.S. Cl. ........................................................ 343/7.3, 343/5 DP
[51] Int. Cl. ........................................................ G01s 9/14
[50] Field of Search ............................................ 343/5 DP, 7, 7.3

[56] References Cited
UNITED STATES PATENTS
3,064,250  11/1962  Close .......................... 343/7.3

Primary Examiner—T. H. Tubbesing
Attorneys—James K. Haskell and Walter J. Adam

ABSTRACT: A system that generates variable rather than fixed velocity and position parameters to minimize the mean square velocity and position errors in an automatic track-while-scan system. The velocity smoothing parameter is a function of the time between scans from which video signals from the particular target are received and a variably generated smoothing term. The position smoothing parameter is a function of the correlation criteria as well as of the smoothing term. The system operates to accurately and reliably track targets while maintaining scanning operations.

SYSTEM FOR AUTOMATICALLY GENERATING SMOOTHING PARAMETERS IN AN AUTOMATIC TRACK-WHILE-SCAN RADAR SYSTEM

This invention relates to track-while-scan radar systems and more particularly to a system for automatically generating smoothing parameters, for track-while-scan equations, employed in a scanning radar system.

Advances in the computer art have led to the development of elaborate track-while-scan radar systems, capable of tracking a plurality of targets, while scanning at the same time the volume of space in which the targets are located. Briefly, in a track-while-scan system, the echoes received in response to each transmitted radar pulse are analyzed to determine the presence of targets and their locations in space. Once a target is detected, signals are automatically supplied to a computer in which the range, azimuth and elevation angles of the target are recorded. On the basis of these position indicating signals for the same target, generated during succeeding radar sweeps or scans, the velocity and direction of movement of the target are automatically derived and the position of the target during subsequent radar scans is predicted. For each radar scan, as signals from the target are received, the predicted position of the target is compared with the actual measured position to continuously update the target's position its latest apparent velocity.

In the prior art, it has been found that the overall accuracy and performance of a track-while-scan system can substantially be increased by updating a target's position not only as a function of its measured position, but also as a function of the difference between the measured position and the predicted target position, multiplied by a factor, known in the prior art as a position smoothing factor. Also, the velocity of the target at any time may be better approximated as a function of the previously computed velocity therefor and an additional velocity increment, the latter being a function of a velocity smoothing parameter.

The use of smoothing parameters in smoothing the position and velocity of a target in a track-while-scan system have been described in the prior art literature. For example, several papers presented at a tracking symposium sponsored by the Mitre Corporation were published in the Proceedings of the Mitre Tracking Symposium, held on Sept. 29, 1959. Several of the papers in the Proceedings make reference to other publications related to the smoothing concepts in track-while-scan radar systems. For example, one such reference is to an article entitled "Analysis of a Smoothing in Track-While-Scan Process" by W. J. Nemerever, published by Boeing Airplane Company in document D5-2361, Oct. 3, 1957.

From the above referred to prior art publications, such as for example, a paper entitled "Investigation of a Double Integrator, Digital Tracker Used in a Track-While-Scan System" authored by H. Poritsky et al., published on Page 45 of the above referred to Proceedings, as well as is appreciated by those familiar with the art, the automatic track-while-scan process may be defined by the following three equations:

$$X_n = X_{pn} - \alpha(X_{pn} - X_{mn})$$
$$\dot{X}_n = \dot{X}_{n11} - \beta/\Delta t (X_{pn} - X_{mn})$$
$$X_{pn+1} = \dot{X}_n + X_n T$$

where $X_n$—smoothed $X$ position coordinate at scan time $n$.
$X_{pn}$—predicted $X$ position coordinate at scan time $n$.
$X_{mn}$—measured $X$ position coordinate at scan time $n$.
$\dot{X}_n$—$X$ component of velocity at scan time $n$.
$\dot{X}_{n11}$—$X$ component of velocity at scan time $n-1$.
$X_{pn+1}$—predicted $X$ position coordinate for scan time $n+1$.
$\Delta t$—time between scans providing blips
$T$—scan time of the system's sensor, hereafter also designated $T$ scan, and
$\alpha$—position smoothing parameter.
$\beta$—velocity smoothing parameter. When the blip to scan ratio is 1, $\Delta t = T$. Hereafter, for simplicity of explanation, the position and velocity smoothing parameters will also be referred to as the $\alpha$ and $\beta$ parameters respectively.

In the prior art track-while-scan systems, the $\alpha$ and/or $\beta$ parameters, when employed were of fixed constant values, rather than adjustable at each measurement. When the target was sensed to be maneuvering, in the prior art systems, a simplified bimodal smoothing concept was employed, whereby $\alpha$ and $\beta$ were each made equal to one. Also in prior art systems, provisions were not made for blip-scan ratios of less than one. As a result, it has been found that the mean square error in position and velocity of the tracked targets was substantial, often resulting in a loss of tracking. A need therefore exists for an improved system to be employed in the automatic track-while-scanning radar systems.

It is therefore a primary object of the present invention to provide an improved system for generating smoothing parameters utilized in automatic track-while-scan radar systems.

Another object of the present invention is to provide a system for generating smoothing parameters so as to minimize the mean square position and velocity errors.

A further object of the present invention is to provide a system constructable with circuits presently known in the art for generating variable rather than fixed velocity and position parameters to minimize the mean square velocity and position errors respectively in an automatic track-while-scan system.

A further object of the present invention is to provide a system for generating variable smoothing parameters to minimize at each and every radar measurement mean square errors up to the assumed steady state condition.

Still a further object of the present invention is to provide a system for generating smoothing parameters regardless of the radar's blip-scan ratio, and which adjusts itself automatically when the radar system senses a maneuvering target.

These and other objects of the present invention are achieved by providing a system wherein the velocity smoothing parameter $\beta$ is made a function of the time between scans from which video signals from the particular target are received, hereafter referred to as time $\Delta t$, and a variably generated smoothing term, hereafter referred to as the $\tau$ term. In accordance with the teachings of the present invention, the $\beta$ parameter is equal to $\Delta t/\tau$, where $\Delta t$ is the time between successive hits or video (blips) from the particular tracked target and $\tau$ is a term which is a function of $\Delta t$ and the particular correlation method and/or criteria used in correlating the measured or detected signals from the target with those predicted therefor, with special maximum limitation placed on the $\tau$ term, as will be hereinafter described in great detail. By correlation method is meant, whether the correlation between measured signals and predicted signals is done manually by an operator, or whether automatic correlation is performed. When automatic correlation is performed, the size of the correlation gate affects the value of the smoothing term $\tau$.

The position smoothing parameter $\alpha$, on the other hand, is made a function of the correlation criteria as well as a function of the correlation $\tau$ term, hereinbefore described. Thus, in accordance with the teachings of the present invention, since the correlation criteria may vary for each radar measurement, and since the time between successive hits from the same target may vary, i.e. the blip to scan ratio is not a constant, the term $\tau$ is a variable and therefore both the $\alpha$ and $\beta$ smoothing parameters are variables rather than fixed. It has been found that by employing variable smoothing parameters, the mean square velocity and position errors are greatly minimized so that targets may more accurately be tracked in an automatic track-while-scan radar system.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGS. 4, 5 and 6 are block diagrams for generating the term τ when correlation is in a manual mode, automatic non-maneuver gate and maneuver gate respectively;

Figure 1A:
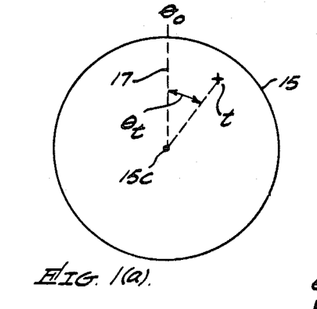
FIGS. 1(a) and 1(b) are diagrams useful in explaining target tracking.
Figure 1B:
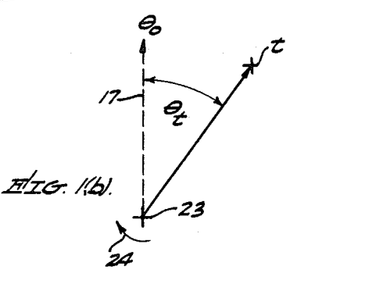

For a better understanding of the teachings of the present invention, reference is first made to FIGS. 1(a) and 1(b) which are diagrams useful in explaining the operation of a track-while-scan radar system. FIG. 1(a) is a diagram of a surface 15 of a target display device, employed in a radar system to display the presence of targets with respect to the center of the display 15c. The relative distance of a target displayed by a cross mark t from the center 15c represents the range of a target from b radar scanner while the angle $\theta_t$ defined by a line interconnecting mark t and center 15c and a reference line 17, representing zero azimuth $\theta_0$ represents the azimuth of the target.

FIG. 1(b) is a diagram useful in explaining the scanning of a target with successive radar scans. Therein, it is assumed that a radar receiving system 20 shown in FIG. 1(c) to which reference is made herein includes a radar scanning antenna 22 which is located at a point 23 as shown in FIG. 1(b). The radar antenna is assumed to continuously rotate in a clockwise direction as indicated by arrow 24. Line 17 in FIG. 1(b) represents zero azimuth $\theta_0$. As is appreciated by those familiar with the art, as the radar antenna rotates by an angle of $\theta_t$ with respect to line 17, the radar antenna is directed towards target t so that echoes in response to radar pulses 25, previously transmitted thereto from a radar transmitter 26, are received by the radar antenna 22.

Figure 1C:
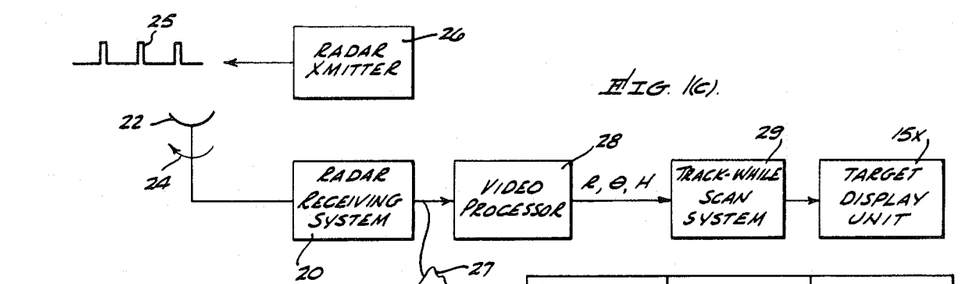
FIG. 1(c) is a block diagram of a track-while-scan system.

These echoes, after passing through the receiving system 20, form video signals 27 which are supplied to a video processor 28 to derive target position information. This information generally includes range or distance, R, of the target t from the antenna 22 of the radar receiving system, an azimuth angle $\theta$, in a reference plane such as an XY plane on which the receiving system is positioned. The height H of the target with respect to the XY plane may be provided from another radar system.

After a time $T_{scan}$, hereafter referred to as the time required for the antenna to be rotated a full circle, the antenna is again directed towards target t, at which time video signals may again be received therefrom. When the blip to scan ratio is less than one, video signals are not received for each scan. The target position information (R, $\theta$ and H) is supplied to a track-while-scan system 29 wherein the information is correlated with previously received information from the same target. On the basis of the new and past information, the target's position is updated and the new position is supplied to a target display unit 15x which includes the display surface 15 FIG. 1(b) on which the target's position is displayed with respect to center 15c. It is appreciated by those familiar with the art that other types of target display may be employed.

In an automatic track-while-scan radar system, the determination to track a given target is made either by an operator or is automatically accomplished by a tracking computer. When manually performed, the operator observes the change in position of the target on the display surface 15 and on the basis of such changes, may decide to cause automatic tracking of the target. This is accomplished by the operator communicating with the computer such as by means of a joy stick or other man-machine communication technique to cause the computer to automatically track the target. When the determination to track is automatically performed, the computer correlates the initial target position in formation from a few successive scans and on the basis of predetermined correlation criteria, provides signals which initiate the automatic target tracking.

Once a determination is made to track a target, the computer stores the target's position information, which generally includes range R and azimuth $\theta$ and on the basis of the assumed target velocity and its direction of motion predicts the position of the target during a succeeding scan. When target position information is received during a succeeding scan, the measured or detected information is correlated with the previously predicted information therefor. If the two correlate in any one of a plurality of correlation gates, the new target position information is assumed to be from the particular tracked target. This information is then used to update the target position and on the basis of the updating, a new position is predicted for a succeeding scan. Thus, briefly described in the automatic track-while-scan system, the measured or newly detected target position information is correlated with previously predicted position therefor and if correlation is present, the measured information is used to update the target's position stored in the computer and predict its new position during a succeeding scan, with the process continuing as long as tracking is automatically performed.

As herebefore indicated, it has been found that the tracking operation can greatly be improved by smoothing the target's updated position rather than by using the actually measured position thereof. As indicated in conjunction with the previous description of equations (1) through (3), the smoothing of the target's position is accomplished by incorporating smoothing factors in the computation of the new position. For example, as seen from equation (1) which is rewritten for explanatory purposes, $$X_n = X_{pn} - \alpha(X_{pn} - X_{mn}) \quad (1)$$

$X_n$ which is the smooth X position coordinate at scan time n is not merely equal to $X_{mn}$ which is the measured X position coordinate at scan time n, but rather is equal to $X_{pn}$ which is the predicted X position coordinate at scan time n minus $\alpha(X_{pn} - X_{mn})$, where $\alpha$ is the position smoothing parameter and $X_{pn} - X_{mn}$ is the difference between the predicted and measured X coordinate, hereinafter also designated generally as $\Delta X$.

Similarly, the new velocity value of the at time n as expressed by $\dot{X}_n$ in equation (2) repeated herein, $$\dot{X}_n = \dot{X}_{n11} - \beta/\Delta t(X_{pn} - X_{mn}) = \dot{X}_{n11} - \Delta X/\tau_n \quad (2)$$

where the velocity during the previous scan is $\dot{X}_{n11} - \beta/\Delta t(X_{pn} - X_{mn})$, $\beta$ represents the velocity smoothing parameter and $\Delta t$ represents the time between successive scans providing video from the target. It is to be noted that if the blip to scan ratio is 1, $\Delta t = T_{scan}$.

As herebefore pointed out, in the prior art systems, the smoothing parameters $\alpha$ and $\beta$ were always constants. However, it has been found that by making $\alpha$ and $\beta$ variables, the mean square error of the system if reduced and therefore automatic tracking is more accurately realizable. In accordance with the teachings of the present invention, a variable smoothing term $\tau$ is generated as a function of the particular mode of correlating the predicted and measured target position information as well as a function of the scan time $T_{scan}$ and $\Delta t$. The velocity smoothing parameter $\beta$ is made equal to $\Delta t/\tau$, while the position smoothing parameter $a$ is made equal to unity under two modes of correlation while its value during a third mode of correlation is dependent on the relative value of $\tau$ with respect to the scan time $T_{scan}$.

Briefly, in accordance with the teachings of the present invention, whenever target position information is received in response to a scan at time n and it correlates in one of the correlation methods with the previously predicted target position, a variable smoothing term $\tau_n$ is generated as a function of the mode of correlation, a previously stored variable term, the scan time $T_{scan}$, and the time $\Delta t$ between time n and the time of a previous scan from target position information was received.

Figure 2:
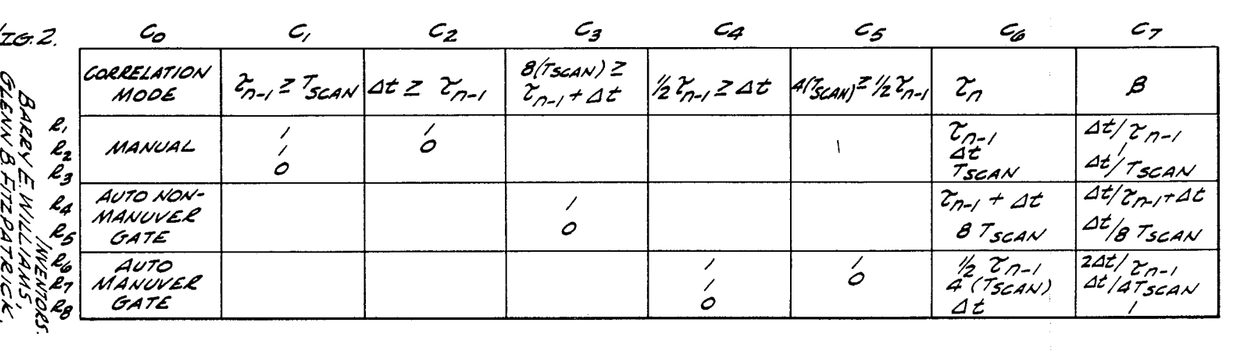
FIGS. 2 and 3 are charts summarizing the values of the variable smoothing parameters as a function of different magnitude relationships.

As seen from the chart of FIG. 2 to which reference is made herein, when the correlation is in a manual mode, that is, an operator viewing the display surface 15 (FIG. 1) determines that new and old target positions relate to the same target, the value of the variable smoothing term $\tau_n$ generated in the system of the present invention is a function of the value of the previously generated $\tau_{n11}$ term with respect to the values of $T_{scan}$ and $\Delta t_m$. $\Delta t_m$ represents the time between time $n$ and a previous updating time, determined by the operator. The subscript $m$ designates a manually controlled $\Delta t$.

When the $\tau_{n11}$ term previously generated is greater or equal to $T_{scan}$ and not greater than $\Delta t_m$, i.e. $\Delta t_m$ is equal or greater than $\tau_{n11}$, the value of the new $\tau_n$ term is equal to the previous $\tau$ term $\tau_{n11}$. On the other hand, if in the manual correlation mode $\tau_{n11}$ is greater or equal to $T_{scan}$ as well as being greater than $\Delta t_m$ as indicated by the one and zero on the second row of the chart, the value of $\tau_n$ is equal to $\Delta t_m$. In the same mode, i.e. the manual mode, if $\tau_{n11}$ is smaller than $T_{scan}$, the value generated for $\tau_n$ is equal to $T_{scan}$. Thus, the operation of the system when correlation is in the manual mode in generating the $\tau_n$ term may be defined by $$v_n \times v_{n11}, \quad (4)$$

limited by $$T_{scan} \leq \tau_n \leq \Delta t_m. \quad (5)$$

If on the other hand, the track-while-scan system is operable in an automatic correlation mode in which a small correlation gate designated in the chart of FIG. 2 as a nonmaneuver gate is being utilized, a value of $\tau_n$ of either $\tau_{n11}+\Delta t$ or $8T_{scan}$ is generated. The former value, i.e. $\tau_{n11}+\Delta t$ is generated when the value $8T_{scan}$ is equal to or greater than $\tau_{n11}+\Delta t$ while the value $8T_{scan}$ is generated for $\tau_n$ when the latter mentioned relationship does not exist. Generating $\tau_n$ when correlation is automatically performed in a nonmaneuver gate may be summarized by $$v_n \times v_{n11}+\Delta t, \quad (6)$$

limited by $$Ft \leq vn \leq 8(T_{scan}). \quad (7)$$

The system of the present invention also includes circuitry for generating $\tau_n$ as a function of automatic correlation performed in a relatively large correlation gate, designated as a maneuver gate. When correlation is performed in such a gate, the value of $\tau_n$ depends on the value of $1/2\ vn_{11}$ with respect to $\Delta t$ and $4T_{scan}$. When $1/2\ vn_{11}$ is equal to or greater than $\Delta t$ and equal or smaller than $4T_{scan}$, the value generated for a $\tau_n$ is $1/2\ vn_{11}$ while the value of $4T_{scan}$ is generated for $\tau_n$ when $1/2\ vn_{11}$ is equal to or greater than a $\Delta t$ but also greater than $4T_{scan}$. If $1/2\ vn_{11}$ is smaller than $\Delta t$, the value $\Delta t$ is generated for $\Delta_n$. The latter relationships may be summarized by the following equations:

$$vn \times 1/2 vn_{11} \quad (8)$$

limited by $$Ft \leq vn \leq 4(T_{scan}). \quad (9)$$

Once the value for $\tau_n$ is generated as a function of the correlation modes and the various relationships hereinbefore described, the value of $\beta$ is simply generated by dividing $\Delta t$ by the value generated for $\tau_n$, i.e. $\beta$ is equal to $\Delta t/\tau_n$.

In a similar manner, the position smoothing parameter $\alpha$ is generated as a function of the particular mode of correlation used in the last correlation operation as well as a function of the value $\tau_n$ with respect to $4T_{scan}$. The various relationships are diagrammed in the chart of FIG. 3 to which reference is made herein. When correlation is in either the manual or automatic mode in which a maneuver gate is employed, he value of $\alpha$ is unity. However, if correlation is performed in a nonmaneuver gate, the value of $\alpha$ depends on the magnitude of $\tau_n$ with respect to $4T_{scan}$. If $4T_{scan}$ is greater or equal to $\tau_n$, the value of $\alpha$ is unity, while if $\tau_n$ is greater than $4T_{scan}$ the value of $\alpha$ is $1/2$.

From the foregoing, it is thus seen that both smoothing parameters $\alpha$ ing on the mode of correlation as well as various value relationships. The various signals necessary to generate $\tau_n$ are provided by the main track-while-scan system in which, as is appreciated by those familiar with the art, signals are produced indicative of the particular mode of correlation. Also, the value for $T_{scan}$ as well as $\Delta t$ are available therefrom. The computer memory of the main track-while-scan system may be used to store therein a previously generated smoothing term $\tau_{n11}$ needed for providing a succeeding term $\tau_n$, which is later stored in the computer for use in succeeding operations. The values $8T_{scan}$, $4T_{scan}$ and $1/2\ vn_{11}$ may be conveniently generated in multiplication or dividing circuitry in manners well known in the art.

Reference is now made to FIG. 4 which is one embodiment of circuitry capable of generating the smoothing term $\tau_n$ when the system is operable in a manual correlation mode to generate a term having one of the three values shown in rows $R_1$, $R_2$, $R_3$ in column $C_6$. The circuitry is shown to include a comparator 41 provided with signals representing $\tau_{n11}$ and $T_{scan}$ while another comparator 42 is provided with signals representing $\Delta t$ and $\tau_{n11}$. The output of comparator 41 is connected to an inverter circuit 43 as well as to comparator 42 and an AND gate 44. When $\tau_{n11}$ is equal to or greater than $T_{scan}$, the output of comparator 42 is of a first binary value, hereafter referred to as true, which enables comparator 42 to compare therein the values $\Delta t$ and $\tau_{n11}$ in order to produce a true output when $\Delta t$ is equal to or greater than $\tau_{n11}$. The output of comparator 42 is connected to an inverter 45 having its output connected to another input terminal of AND gate 44, the output of which is connected to a gate 46. The circuitry also includes a gate 47 which is enabled to pass therethrough an input signal $T_{scan}$ when the output of inverter 43 is true; that is, when he output of comparator 41 is false, represented by a second binary level of the output signal thereof. Similarly, a gate 48 is employed to pass therethrough an input $\tau_{n11}$ when the output of comparator 42 is true.

It should be appreciated that since any of the signals $\Delta t$, $\tau_{n11}$ and $T_{scan}$ may be multibit numbers, each of gates 46, 47 and 48 is assumed to be a multibit gate respectively controlled by the true outputs of ANd gate 44 and inverters 43 and 45. The multibit outputs of the various gates may be connected through a plurality of OR gates such as gate 49 to provide a multibit output representing $\tau_n$ which is equal in value to one of the three inputs thereof. The output of gate 49 is connected to an AND gate 49x having another input energized by a manual correlation signal so that only when the system is operable in a manual correlation mode does AND gate 49x have an output which is equal to the output of OR gate 49.

Figure 5:
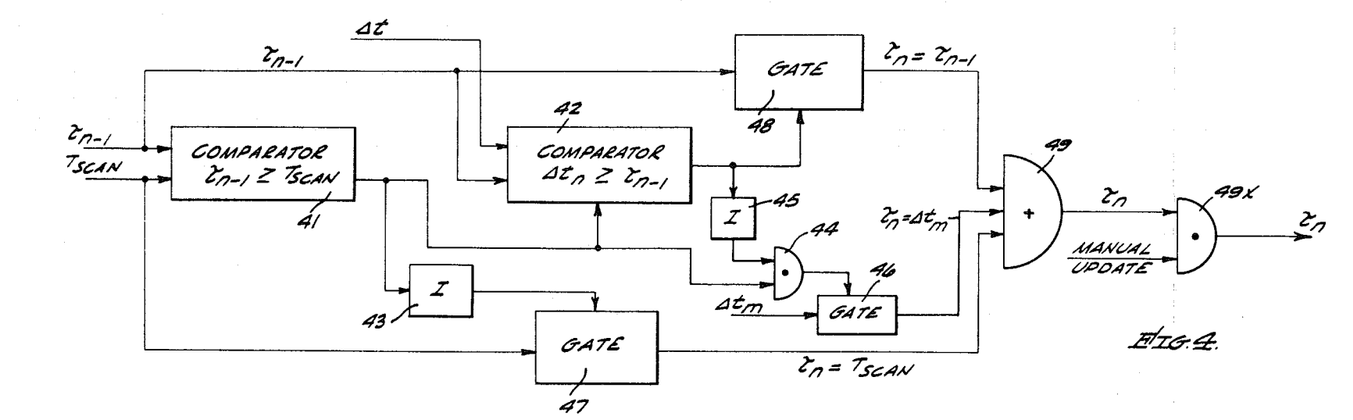

In a similar manner, circuitry diagrammed in FIG. 5, to which reference is made herein, generates the term $\tau_n$ when the system is operable in an automatic correlation mode where a nonmaneuver gate is employed. The circuitry includes an adder 51 providing an output which is the sum of the two inputs $\tau_{n11}$ and $\Delta t$ supplied thereto. The sum signal together with a signal $8T_{scan}$ is supplied to a comparator 52, the output of which is connected to a gate 53 and to an inverter 54. Gate 53 is provided with a multibit signal representing $\tau_{n11}+\Delta t$ while a gate 55 controlled by the output of inverter 54 is supplied with a multibit signal representing $8T_{scan}$. Only when $8T_{scan}$ is equal to or greater than $\tau_{n11}+\Delta t$ does comparator 52 provide a true output which enables gate 53 to supply the signal representing $\tau_{n11}+\Delta t$ to an Or gate 59.

On the other hand, when $\tau_{n11}+\Delta t$ is greater than $8T_{scan}$, the output of comparator 52 is false 19. A prcess according to claim 7 wherein said inhibitor is potassium monopersulfate.

20. A process according to claim 7 wherein said inhibitor is formaldehyde.

21. A bleaching composition consisting essentially of on a weight basis (I) from about 0.1 percent to about 15 percent of hydroxylamine salt as inhibitor compound capable of inhibiting enzyem-induced decomposition of water soluble inorganic peroxide bleaching agent and (II) a substance selected from the group consisting of (a) from about 2 percent to about 85 percent of a water soluble inorganic peroxide bleaching agent, (b) from about 5 percent to about 90 percent of a water soluble organic detergent and (c) mixtures of (a) and (b) with the proviso that in the case of mixtures of (a) and (b), at least about 10 percent being each of bleaching agent and detergent.

22. A composition according to claim 21 wherein said substance is selected from the group consisting of from about 2 percent to about 85 percent of a water soluble inorganic peroxide bleaching agent and mixtures of from about 10 percent to about 85 percent of a water soluble inorganic peroxide bleaching agent with from about 10 percent to about 99 percent of a water1soluble organic detergent.

23. A composition according to claim 21 wherein said bleaching agent is sodium perborate tetrahydrate.

24. A composition according to claim 21 wherein said bleaching agent is sodium perborate monhydrate. and therefore the output of inverter 54 is true, enabling gate 55 to pass therethrough a multibit number representing $8T_{scan}$ to another input of Or gate 59. Gate 59, similar to gate 49 hereinbefore described, is assumed to represent a plurality of OR gates, the combination of which provides a multibit output signal which is supplied to a plurality of AND gates, one of which is designated by numeral 59x. Each of the AND gates 59x is provided with an enabling signal generally designated OG representing that the track-while-scan system is operable in the automatic mode with a nonmaneuverable correlation gate. Thus the output of AND gate 59x when the system is operable in such a correlation mode is either the output of gate 53 which is $\tau_{n11} + \Delta t$ or $8T_{scan}$.

Figure 6:
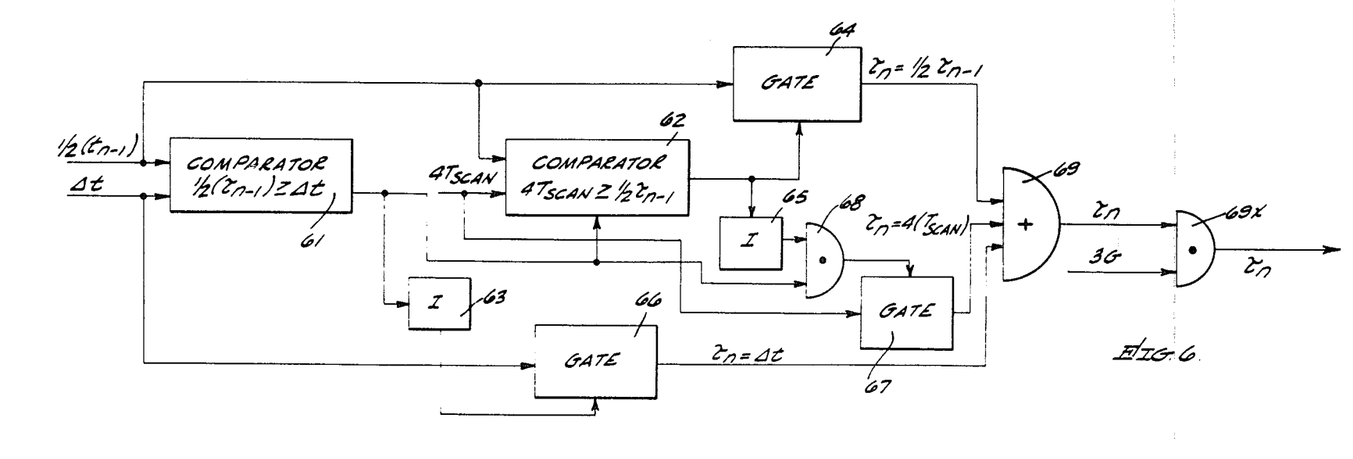

In a similar manner, the circuitry diagrammed in FIG. 6, to which reference is made herein, responsive to signals $\Delta t$ and $1/2\ vn_{11}$, provides an output $\tau_n$ which is one of the three values shown in lines $R_6$, $R_7$, and $R_8$ in the chart of FIG. 2 when the track-while-scan system is operable in an automatic correlation mode using a maneuver gate, which in FIG. 6 is represented by the signal 3G. The circuitry of FIg 6 is shown to include a comparator 61 providing a true output signal when $1/2\ vn_{11}$ is equal to or greater than $\Delta t$ and a comparator 62 providing a true output signal when he one input thereof $4T_{scan}$ is equal to or greater than another input of $1/2\ vn_{11}$. The output of comparator 61 is connected to control the operation of comparator 61 as well as to an inverter 62 while the output of comparator 62 is connected to control a gate 64 and an inverter 65. Inverter 63 controls the operation of a gate 66 while inverter 65 controls the operation of a gate 67 through an AND gate 68 having another input thereof connected to the output of comparator 61.

Each of gates 64, 66 and 67 is operable to pass an input signal thereto only when the control signal supplied thereto is true. Thus when the output of comparator 61 is false, i.e. $\Delta t$ is greater than $1/2\ vn_{11}$, the output of inverter 63 s true thereby enabling gate 66 to pass therethrough its input of $\Delta t$. Similarly, gate 64 passes therethrough its input signal $1/2\ vn_{11}$ only when the output of comparator 62 is true. On the other hand, when the output of comparator 61 is true and the output of comparator 62 is false, the two inputs to AND gate 68 are true and thereby gate 67 is enabled to pass therethrough the input of $4T_{scan}$.

The outputs of the three gates are supplied to a plurality of OR gates 69, one of which is shown in FIG. 6. The output of OR gate 69 represents the value $\tau_n$ which is supplied to a plurality of AND gates 69x, one of which is shown in FIg. 6. Each one of the ANd gates 69 is controlled by the signal 3G indicating that the system is operable in an automatic correlation mode with a maneuverable correlation gate. Thus AND gates 69x provide the variable smoothing term $\tau_n$ only when the system is in the automatic correlation mode with the maneuverable correlation gate, with the output the value of $\tau_n$ being one of the values of the three gates in FIG. 6.

Figure 7:
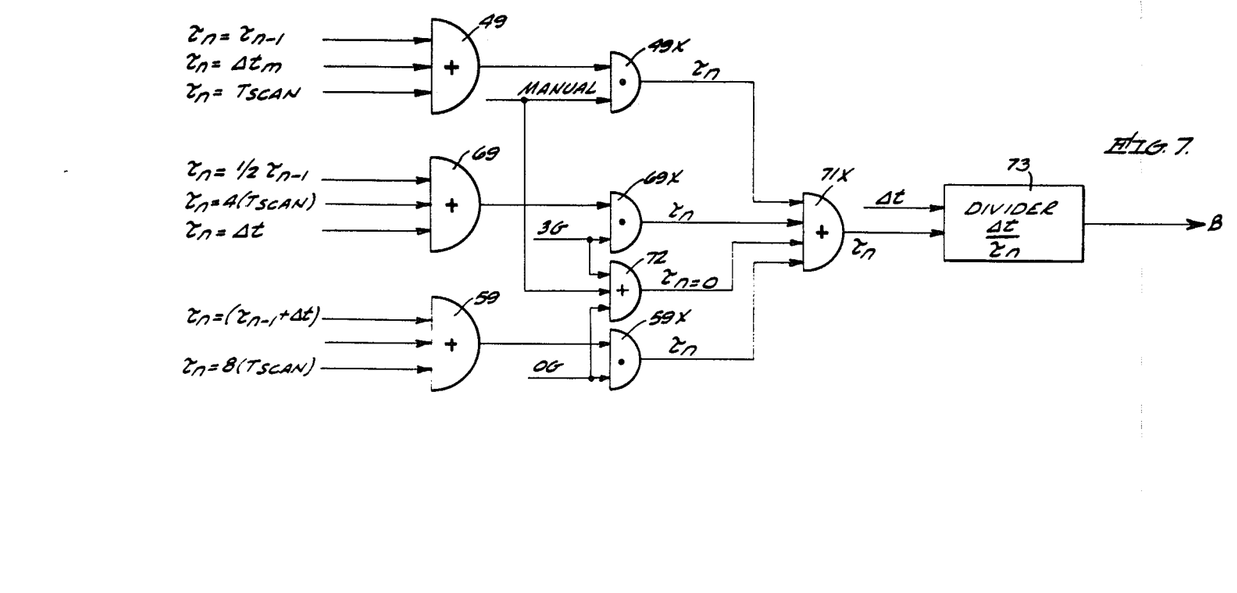
FIG. 7 is a block diagram for generating the velocity smoothing parameter β.

Reference is now made to FIG. 7 wherein multigates 49, 59 and 69 are shown connected to their respective ANd gates 49x, 59x, 69x. From the foregoing description, it should be apparent that the gates represented by gate 49x provide a $\tau_n$ output when the system is operable in a manual mode of correlation while gates 59x or 69x provide $\tau_n$ outputs when the system is operable in an automatic mode of correlation when a nonmaneuverable or maneuverable correlation gates are employed respectively. The outputs of multigates 49x, 59x and 69x are supplied to a plurality of OR gates 71x one of which is shown in FIG. 7. Thus the output of OR gates 71x is a multibit value representing $\tau_n$.

In addition to the foregoing described circuitry, the circuitry necessary for generating $\tau_n$ also includes an additional OR gate 72 having three inputs to which signals representing the manual, as well as the two automatic modes of operation, are provided. Only when all the three inputs thereof are false, indicating that the system is neither operating in a manual mode nor operating with either of the two correlation gates 0G and 36, does the OR gate 72 provide a false output representing $\tau_n$ equal to zero which passes through OR gates 71x to represent a $\tau_n$ value of zero. During initiation of track, until sufficient measurements are obtained for correlation, the gate 72 maintains $\tau_n$ equal to zero allowing the smoothing operation to start from zero or with very light smoothing.

The output of OR gate 71x representing the value of $\tau_n$ is supplied together with a value representing $\Delta t$ to a divider circuit 73 which divides $\Delta t$ by $\tau_n$ to produce the velocity smoothing parameter $\beta$ hereinbefore referred to. It should be appreciated however that since in equation (2) in which $\beta$ is employed, it is divided by $\Delta t$ instead of generating the term $\beta$, and then dividing it by $\Delta t$, the term $1/tn$ may be employed in equation (2) since $1/\tau_n = \beta/\Delta t$. However hereafter for explanatory purposes, it will be assumed that the parameter $\beta$ is generated in order to complete the description of the novel system of the invention for generating velocity and position smoothing parameters.

Figure 8:
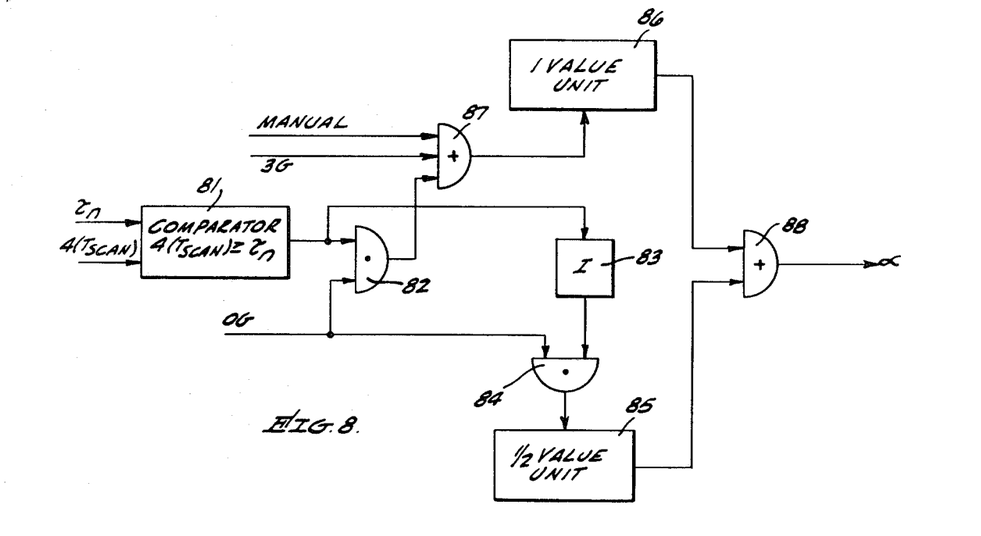
FIG. 8 is a block diagram for generating the position smoothing parameter α.

Reference is now made to FIG. 8 which is a block diagram for generating the position smoothing parameter $\alpha$. As herebefore described in conjunction with the chart shown in FIG. 3, the position smoothing parameter $\alpha$ is generated as a function of the particular correlation mode and the relative value of $\tau_n$ with respect to $4T_{scan}$. When correlation is in either the manual mode or an automatic correlation mode with a maneuver gate, the value of $\alpha$ is equal to unity. On the other hand, if correlation is automatic with a nonmaneuver gate, the value of $\alpha$ is either unity or 1/2 unity, the latter value being generated when $\tau_n$ is greater than $4T_{scan}$.

In accordance with the teachings of the present invention, the circuitry is provided to generate $\alpha$ which includes a comparator 81 provided with signals representing $\tau_n$ and $4T_{scan}$. The output of comparator 81 is true when $4T_{scan}$ is equal to or greater than $\tau_n$. This output is supplied to an ANd gate 82 as well as to an inverter 83. A signal representing automatic correlation with a nonmaneuver gate, designated 0G, is supplied to the other input of AND gate 82 as well as to an AND gate 84 provided with the output of inverter 83, with the output of the latter gate being supplied to a circuit 85 which is designated as a 1/2 value unit.

Briefly, the function of circuit 85 is to provide an output which represents the value 1/2 being enabled by the true output of gate 84. The circuitry for generating $\alpha$ also includes a circuit 86 which provides an output of unity when enabled by the output of an OR gate 87 having one of its input terminals connected to the output gate 82 and two other input terminals supplied with signals representing manual and automatic correlation in a maneuver gate, designated by 3G. From the foregoing, it should be appreciated that circuit 86 provides an output representing unity when correlation is in either manual or automatic correlation in a maneuver gate as well as when correlation is in an automatic nonmaneuver gate (signal 0G) and $4T_{scan}$ is equal to or greater than $\tau_n$ as indicated when the output of AND gate 82 is true. On the other hand, if when operated in an automatic nonmaneuver gate and the output of comparator 81 is false, the output of inverter 83 will be true and therefore the two input signals to ANd gate 84 will be true. Consequently, circuit 85 will be enabled to provide an output which represents the value of half unity. The output of circuits 85 and 86 are supplied to an OR gate 88, the output of which represents the position smoothing term $\alpha$.

Although, herebefore, specific circuitry has been described for generating the term $\tau_n$ and therefrom the velocity and position smoothing parameters $\beta$ and $\alpha$ respectively, it should be appreciated to those familiar with the art that the arithmetic operations necessary to generate these parameters may be performed by the computer, employed in every automatic track-while-scan system. This may be accomplished by writing a specific computer program so that before the velocity and position smoothing parameters are to be incorporated in the track-while-scan equations, the smoothing term is first generated in accordance with the teachings hereinbefore described.

Figure 9:
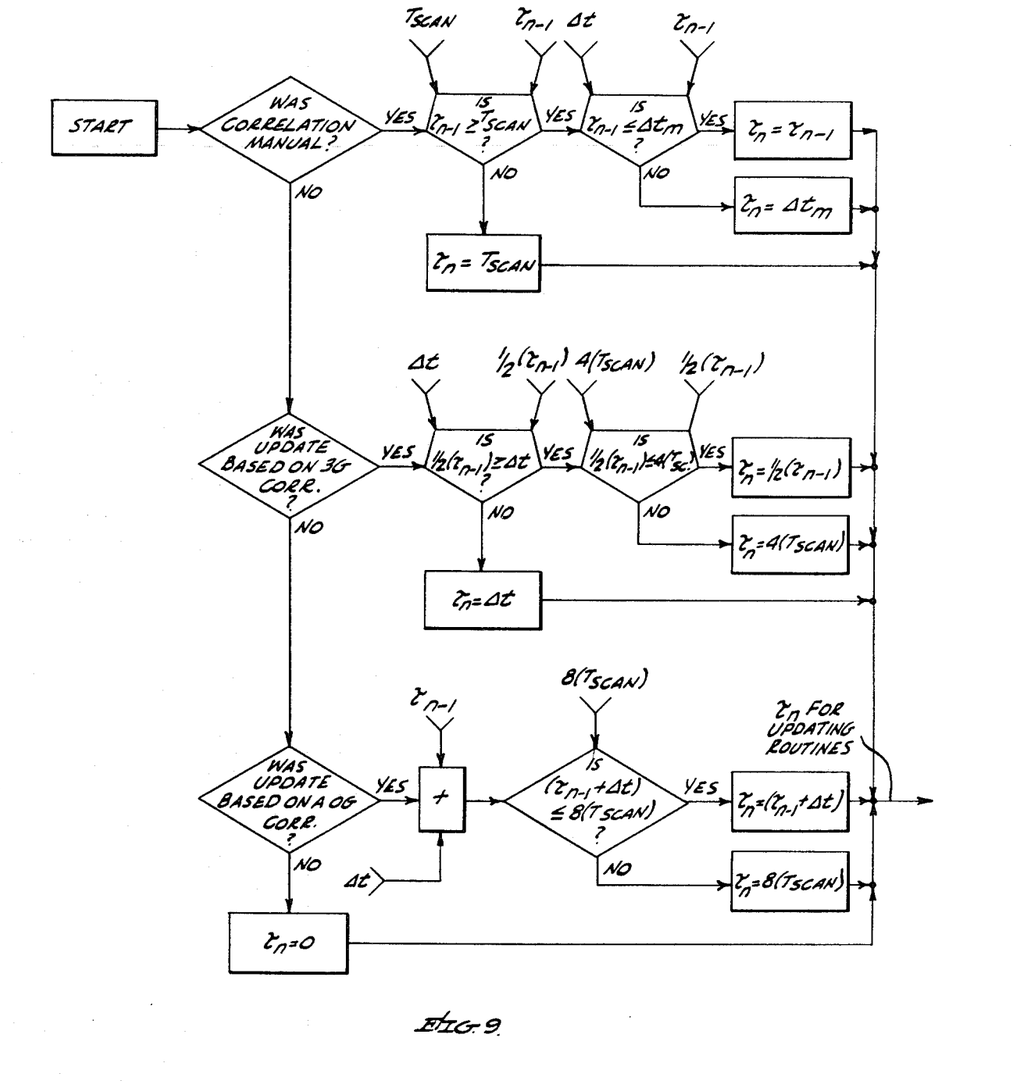
FIGS. 9 and 10 are computer program flow diagrams for generating β and α respectively.
Figure 10:
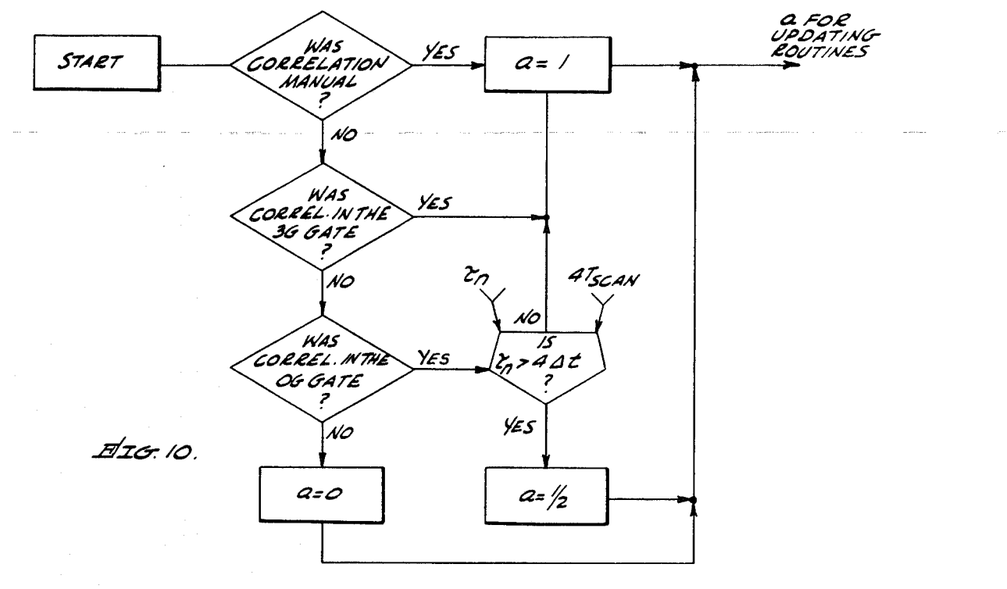

Reference is now directed to FIG. 9 which is a flow diagram of a program which may be used to generate the term $\tau_n$ in accordance with the teachings hereinbefore described. The diagram is presented in a manner well familiar to those skilled in the art of computer programming. Similarly, FIG. 10 represents a flow diagram of a computer program necessary for generating $\alpha$ in accordance with the teachings of the present invention.

The teachings of generating variable velocity and position smoothing parameters may further be highlighted by the following examples. For the first example, let it be assumed that a blip to scan history may be represented by the following line (moving from left to right) wherein the ones represent hits and the zeros represent misses:

$$1\ 1\ 1\ 1\ 1\ 0\ 0\ 1\ 0\ 1\ 1\ 1\ 1\ 1$$

It is assumed that all correlation is in the automatic mode in a nonmaneuver gate (0G) and that $T_{scan}$ is ten seconds. For the first nonmaneuver correlation, $\tau_{n11}=0$; thus, $\Delta t=10$ sec., $\tau_1=10$ sec., $\beta_1=1$
$\Delta t=10$ sec., $\tau_2=20$ sec., $\beta_2=1/2$
$\Delta t=10$ sec., $\tau_3=30$ sec., $\beta_3=1/3$
$\Delta t=10$ sec., $\tau_4=40$ sec., $\beta_4=1/4$
$\Delta t=10$ sec., $\tau_5=50$ sec., $\beta_5=1/5$ The target is missed on scans 6 and 7, so that at scan 8, $\Delta t=30$ sec. Therefore $\tau_8=50+30=80$ sec. and $\beta_8=30/80=3/8$. The target is missed on scan 9, so that at scan 10, $\Delta t=20$ sec. But $\tau_{10}$ remains 80 sec. since $\tau_n \leq 8(T_{scan})$ for a nonmaneuver correlation update. Thus $\beta_{10}=20/80=1.4$. For scan 11, $\Delta t=10$, but $\tau_{11}$ remains 80 and $\beta_{11}=1/8$. Due to he history assumed, the remainder of the example shows no change of values from the $\tau_{11}$ case, so that $\beta_{11}$ through $\beta_{14}$ is 1/8.

Another example is of interest. Assume a target is maneuvering and has a history of correlations in the maneuver gate (3G). Accordingly the equation $\tau_n=1/2\ \tau_{n11}$ has been employed successively until $\tau_n$ has been stepped down to 10 seconds, since the rule $\Delta t \leq \tau_n \leq 4(T_{scan})$ for a maneuver correlation update now applies. Now the target ceases to maneuver and begins a history of successive correlations in the nonmaneuver gate. $\tau_n$ is stepped back toward maximum value as follows:

$\Delta t=10$ sec., $\tau_1=20$ sec., $\beta=1/2$
$\Delta t=10$ sec., $\tau_2=30$ sec., $\beta=1/3$
$\Delta t=10$ sec., $\tau_3=40$ sec., $\beta=1/4$
.
.
$\Delta t=10$ sec., $\tau_7=80$ sec., $\beta=1/8$ Thus, after a tracked maneuver followed by an ideal blip-scan history, the transient is completely counted out of the tracking equation at the seventh scan.

As herebefore explained, the position smoothing parameter $\alpha$ may have a value of 1/2 or 1, depending on the type of update achieved, as modified, in some cases, by the value of $\tau$, the velocity smoothing parameter.

Figure 3:
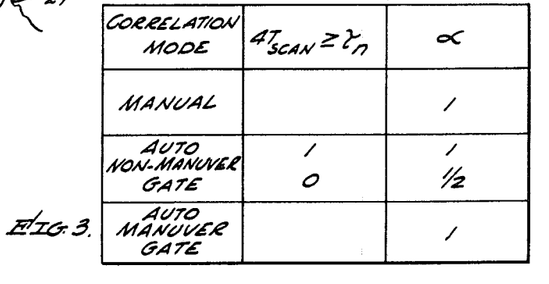

The following example may be helpful in understanding the derivation of a value for $\alpha$. Assume the following blip to scan history where time increases from left to right:

For purposes of this example, let is be assumed that track correlation is initially achieved in a nonmaneuver gate for scans 1 through 5. Later a maneuver is executed and the hits are correlated in the maneuver gate 3G for scans 6–11. Finally, a straight leg is flown, correlation being achieved in the nonmaneuver gate. Assuming $\tau_0=0$, then the following values are generated for $\tau_n$ as a function of $\Delta t$, $\tau_{n11}$, the mode of correlation and the value limits. Once $\tau_n$ is generated $\alpha$ becomes a function of the mode of correlation and in the nonmaneuver mode a function of $4T_{scan} \geq \tau_n$ (FIGS. 3 and 8).

$\Delta t=10$ sec.; $\tau_1=10$ sec.; $\alpha_1=1$
$\Delta t=10$ sec.; $\tau_2=20$ sec.; $\alpha_2=1$
$\Delta t=10$ sec.; $\tau_3=30$ sec.; $\alpha_3=1$
$\Delta t=10$ sec.; $\tau_4=40$ sec.; $\alpha_4=1$
$\Delta t=10$ sec.; $\tau_5=50$ sec.; $\alpha_5=1/2$ since $\tau_5>4T_{scan}$
$\Delta t=10$ sec.; $\tau_6=25$ sec. because $\tau_n=1/2\ \tau_{n11}$; $\alpha_6=1$ On scans 7 and 8, the target is missed, so that $\Delta t_9=30$ sec. Thus $\Delta t_9 > 1/2\ \tau_8$. Therefore, $\tau_9=\Delta t_9=30$ sec. (see FIG. 6), and $\alpha_9=1$.

On scan 10, the target is missed, so that $\Delta t_{11}=20$ seconds. Thus $\tau_{11}=\Delta t_{11}=20$ sec. and $\alpha_{11}=1$. Thereafter correlation is in a nonmaneuver gate and 66 $t$ is 10 seconds so that each succeeding $\tau_n$ is $\tau_{n11}+\Delta t$ with a maximum of $\tau_n=8(T_{scan})$. (See FIG. 5). On the other hand, in a correlation with a nonmaneuver gate $\alpha$ is 1 until $\tau_n$ is greater than $4(T_{scan})$. (See FIG. 8). Thus, $\tau_{12}=30$ sec.; $\alpha_{12}=1$
$\tau_{13}=40$ sec.; $\alpha_{13}=1$
$\tau_{14}=50$ sec.; $\alpha_{14}=1/2$ since $\tau_{14}>4(T_{scan})$
$\tau_{15}=60$ sec.; $\alpha_{15}=1/2$
$\tau_{16}=70$ Sec.; $\alpha_{16}=1/2$ This example demonstrates the immediate response of $\alpha$ to a maneuver (as in scan six) and the rapidity with which $\alpha$ reaches its minimum value (as in scan five) after beginning with a minimum $\tau_1=10$ seconds.

From the foregoing description, it should thus be appreciated that in accordance with the teachings of the present invention, means are provided for generating variable velocity and smoothing parameters $\beta$ and $\alpha$ respectively. This is accomplished by generating a smoothing term $\tau$ which is made a function of the mode of correlation, as well as values of other related signals, such as $\Delta t$, $T_{scan}$, $1/2\ \tau_{n11}$, where $\tau_{n11}$ represents a previously generated smoothing term. In practice, the term $\tau_n$ as well as the velocity and smoothing parameters are generated during the track-while-scan computational operations at a point when the parameters are to be employed in the track-while-scan equations in updating a target velocity and position.

In one actual reduction to practice, target position information derived from processing video information from a target was supplied in the form of range and azimuths to the track-while-scan system in which the novel teachings of the present inventi 1 were incorporated. Therein, the measured range and azimuth were converted into X and Y measured coordinates of the target designated $X_{gm}$ and $Y_{gm}$ where the subscript gm indicates measured ground data. Thereafter, the difference between the measured ground coordinate and the predicted ground coordinate at the particular point in time was derived by subtracting the measured ground coordinate from the predicted or extrapolated ground coordinate to generate two signals designated $\Delta X_g$ and $\Delta Y_g$ where $$\Delta X_g = X_{gv} - X_{gm} \quad (10)$$
$$\Delta Y_g = Y_{gv} - Y_{gm} \quad (11)$$

After deriving the terms $\Delta X_g$ and $\Delta Y_g$, the smoothing factor $\tau_n$ was generated and therefrom the velocity and position smoothing parameters $\beta$ and $\alpha$ were derived therefrom. The velocity smoothing parameter $\beta$ was employed in solving equation (2) repeated herein for explanatory purposes $$\dot{X}_{gn} = \dot{X}_{n11} - \beta/\Delta t(X_{pn} - X_{mn}) = (\dot{X}_g)_{n11} - \Delta X_g/\tau_n \quad (2)$$

wherein $\dot{X}_{gn}$ represents the smooth velocity in the X direction of the target at time $n$. A smooth velocity in the Y direction was generated in accordance with the following relationship:

$$\dot{Y}_{gn} = (\dot{Y}_g)_{n11} - 66Y_g/\tau_n \quad (12)$$

In equation (12), $\dot{Y}_{gn}$ represents the smooth ground velocity in the Y direction at time $n$, shown to be a function of the smooth velocity in the Y direction at a previous time $n-1$, $\Delta Y_g$ and the smoothing term $\tau_n$.

After deriving the smooth X and Y velocities of the target at time $T_n$ and X and Y position of the target at time $n$ were smoothed in accordance with the following relationships:

$$X_{gn} = X_{ge} - \alpha \Delta X_g + \dot{X}_{gn} T_a \quad (13)$$
$$Y_{gn} = Y_{ge} - \alpha \Delta Y_g + \dot{Y}_{gn} T_a \quad (14)$$

In equations (13) and (14), $\alpha$ represents the position smoothing parameter while the term $T_a$ is the accumulated time between the time that the target position information was actually received by the radar system and the time when the circuitry operates thereon. Thus, the terms $X_{gn}$ and $Y_{gn}$ represents the X and Y ground coordinate of the target at the time that the computations are actually being made, thereby updating the position information to he time of computing such data. On the basis of the last computed X and Y target coordinates, the X and Y coordinates of the target during a succeeding scan are predicted on the basis of the time required for the scanning antenna to again scan the target as well as the updated smoothed X and Y velocities of the target.

The predicted X and Y coordinates of the target during the succeeding scan are then employed in the track-while-scan system in manners known in the art and converted into predicted range and azimuth for the target during the succeeding scans. These predicted range and azimuth values, designated $R_p$ and $\theta_p$ are employed in the track-while-scan system to generate the signals necessary for the succeeding correlation to compare or correlate the predicted range and azimuth with the actually measured range and azimuth of the target received from the measured target position during the succeeding scan.

In the actual reduction to practice, hereinbefore referred to, in which $T_{scan}$ was 10 seconds, the value $T_a$ representing the time between the instant that the position of the target is actually measured and the time that the computer provides the smoothed coordinates thereof, was only less than three seconds. In order to have extrapolated target coordinates between the time that the last updated coordinates are generated and the succeeding scan when succeeding signals are received from the target, the track-while-scan system may include circuitry to extrapolate the target's coordinate by utilizing the last smoothed coordinates thereof and modifying it by the time between extrapolated updatings and the last smoothed velocity of the target. Thus, for example, the X coordinate of a target designated $X_{ge}$ may be made equal to $X'_{ge} + \Delta't_e \dot{X}_{gn}$, where $X'_{ge}$ represents the last extrapolated X coordinate, $\Delta t_e$ represents the time between extrapolated updatings and $\dot{X}_{gn}$ represents the last smoothed updated velocity in the X direction.

From the foregoing, it should be appreciated to those familiar with the art that, in accordance with the teachings of the present invention, circuitry is provided for generating a smoothing term $\tau$ from which the velocity and position smoothing parameters $\beta$ and $\alpha$ respectively may be generated. The term $\tau$ is not fixed, but rather is made a variable as a function of the mode of correlation in the track-while-scan system and the scan time, the time between scans providing video signals from the target, as well as the value of the term $\tau$ previously generated for a target during a preceding position updating operation. Thus, $\tau$ is a variable and therefore the smoothing terms $\beta$ and $\alpha$ are also variables as a function thereof. It should further be appreciated that those familiar with the art may make modifications in the arrangements as shown without departing from he true spirit of the invention. Therefore, all such modifications and/or equivalents are deemed to fall within the scope of the invention as claimed in the appended claims.

What is claimed is:

1. In a track-while-scan radar system wherein video signals from a target are received in at least some radar scans, each scan being responsive to another radar pulse transmitted in the direction of said target, said radar system including a video processor for providing the range and azimuth values for said target by processing the video signals received therefrom, the track-while-scan radar system further including track-while-scan means for storing the range and azimuth values of he target and for correlating said values with subsequently derived values, said track-while-scan means automatically providing signals representing the predicted range and azimuth of the target at a succeeding scan time, and means for correlating in accordance with any one of a plurality of correlation criteria subsequently received values with the predicted values and to smoothly update the values of the target's range and azimuth, said smoothly updated values being functions of selected velocity and position smoothing parameters, the improvement comprising:

means for generating a variable smoothing term $\tau_n$ as a function of at least the time between scans providing video signals from said target $\Delta t$, and the value of a previously stored variable smoothing term $\tau_{n11}$, said term $\tau_n$ being related to a velocity smoothing parameter $\beta$, where $\beta = \Delta t / \tau_n$; and means responsive to said variable smoothing term $\tau_n$ for deriving a variable position smoothing parameter $\alpha$ as a function of the value of $\tau_n$ with respect to a preselected threshold value when said radar system is operated in accordance with a selected correlation criteria.

2. In a track-while-scan radar system wherein video signals from a target are received in at least some of a series of sequential radar scans directed at said target, said radar system including means for processing each of said video signals to provide target position information and track-while-scan means for operating upon target position information successively processed to automatically derive smoothed target position and velocity values for said target and signals indicative of the target's position at a succeeding scan, a system for automatically generating at least a velocity smoothing parameter comprising:

means for generating a variable smoothing term $\tau$ as a function of at least the time between successive scans $T_{scan}$, the time between successive scans providing video signals from said target $\Delta t$, a variable smoothing term $\tau_{n11}$ generated by said means during a preceding operation; and dividing means responsive to $\tau_n$ and $\Delta t$ for generating a variable smoothing velocity parameter $\beta$, whereby $\beta = \Delta t / \tau_n$.

3. The system defined in claim 2 further including means responsive to said variable smoothing term $\tau_n$, the time $T_{scan}$ times an integer $n$ and signals representing different modes of processing said video signals to generate a position smoothing parameter $\alpha$ as a function thereof.

4. In a track-while-scan radar system including means for scanning a target with a series of scans, means for receiving video signals from the target in response to at least some of said scans, means for processing the video signals from each scan to derive measured target position information, track-while-scan means including means for correlating the measured target position information with previously predicted position information stored in said storing means to track said target, said correlation being in accordance with any one of a number of correlation modes, including a manual mode of correlation and first and second automatic correlation modes, said track-while-scan means further including means for updating the position of said target by providing smoothed target position information as a function of the measured target position information, previously smoothed target position information and smoothing parameters, the improvement comprising:

first generating means for generating a variable smoothing term $\tau_n$ as a function of a previously generated variable smoothing term $\tau_{n11}$, the time between successive scans $T_{scan}$, the time between scans producing video signals from the target, $\Delta t$, and first, second and third signals representing said correlation as being in manual, first and second automatic modes respectively;

means for storing said generated variable smoothing term $\tau_n$ for use in generating a subsequent variable smoothing term $\tau_{n+1}$;

second generating means responsive to said generated variable smoothing term $\tau_n$ and the time between scans producing video signals from the target $\Delta t$ for generating a velocity smoothing parameter $\beta_n$ where $\beta_n = \Delta t / \tau_n$; and third generating means responsive to said variable smoothing term $\tau_n$ and said first, second and third signals for generating a position smoothing parameter $\alpha_n$ as a function thereof.

5. The system defined in claim 4 wherein said first generating means includes fourth means for generating $\alpha_n$ as a function of $\alpha_{n11}$, $T_{scan}$ and $\Delta t$ when said correlation is in a manual mode.

6. The system defined in claim 5 wherein said fourth means includes a first comparator for providing a first output signal of a first binary state when $\tau_{n11}$ is equal or greater than $T_{scan}$ and of a second binary state when $\tau_{n11}$ is smaller than $T_{scan}$, a second comparator controllable by the first output signal of a first binary state to provide a second output signal of a first binary state when $\Delta t$ supplied thereto is equal or greater than the term $\tau_{n11}$ compared therein, and to provide a second output signal of a second binary state when $\Delta t$ is smaller than $\tau_{n11}$ and means responsive to signals $\tau_{n11}$, $T_{scan}$ and the binary states of said first and second output signals for providing an output $\tau_n = \tau_{n11}$ when $\Delta t \tau_{n11} \geq T_{scan} \geq$ where $\geq$ indicates equal or greater, an output $\tau_n = \Delta t$ when $\tau_{n11}$ is equal or greater than $T_{scan}$ and greater than $\Delta t$ and an output $\tau_n = T_{scan}$ when $\tau_{n1} \leq T_{scan}$.

7. The system defined in claim 4 wherein said first generating means includes fifth means for generating $\tau_n$ as a function of $1/2(\tau_{n11})$, $\Delta t$ and $4T_{scan}$, when said correlation is in said first automatic mode.

8. The system defined in claim 7 wherein said fifth means comprise first and second comparators for comparing the value of $1/2(\tau_{n11})$ with $\Delta t$ and $4T_{scan}$ respectively and means responsive to the signals $1/2(\tau_{n11})$, $\Delta t$, $4T_{scan}$ and outputs of said first and second comparators for providing an output of $\tau_n = 1/2\tau_{n11}$ when $4T_{scan} \geq 1/2\tau_{n11} \geq \Delta t$, $\tau_n = 4T_{scan}$ when $1/2\tau_{n1} \geq \Delta t$ and greater than $4T_{scan}$ and $\tau_n = \Delta t$ when $\Delta t > 1/2\tau_{n1}$.

9. The system defined in claim 4 wherein said first generating means includes sixth means for generating $\tau_n$ as a function of signals $\tau_{n11}$, $\Delta t$, $8(T_{scan})$ when said correlation is in said second automatic mode.

10. The system defined in claim 9 wherein said sixth means comprise an adder for providing the sum of the values of $\tau_{n11}$ and $\Delta t$;

comparing means for providing an output of a first binary value when $8T_{scan}$ is equal or greater than $\tau_{n11} + \Delta t$; and means responsive to the output of said comparing means said $8(T_{scan})$ and $\tau_{n11} + \Delta t$, for providing an output $\tau_n = \tau_{n11} + \Delta t$ when $8T_{scan} \geq \tau_{n11} + \Delta t$ and an output of $\tau_n = 8T_{scan}$ when $\tau_{n11} + \Delta t > 8T_{scan}$.

11. The system defined in claim 4 wherein said first generating means includes a plurality of comparing means, logic and gating circuitry responsive to said first, second and third signals and signals representing the following values $\Delta t$, $T_{scan}$, $4T_{scan}$, $8T_{scan}$, $\tau_{n11}$ and $1/2(\tau_{n11})$ for providing an output of $\tau_n = \tau_{n11}$ with $\tau_n$ not greater than $\Delta t$ and not smaller than $T_{scan}$ when said correlation is in said manual mode, indicative by said first signal, an output of $\tau_n = \tau_{n11} + \Delta t$ with $\tau_n$ not greater than $8T_{scan}$ and not smaller than $\Delta t$ when said correlation is in said second automatic mode indicative by said third signal and an output of $\tau_n = 1/2\tau_{n11}$ with $\tau_n$ not greater than $4T_{scan}$ and not smaller than $\Delta t$ when said correlation is in said first automatic mode indicative by said second signal.

12. The system defined in claim 11 wherein said second generating means comprise dividing means responsive to said smoothing term $\tau_n$ generated in said first generating means and said $\Delta t$ signal for generating said velocity smoothing parameter $\beta_n$ by dividing $\Delta t$ by $\tau_n$, and herein said third generating means include a comparator for comparing the value of $\tau_n$ with $4(T_{scan})$ and provide a first binary signal when $4T_{scan}$ is equal to or greater than $\tau_n$ means for generating a value of unity; means for generating a value of 1/2 unity; and gating means responsive to said first, second and third signals representing the correlation modes for providing a position smoothing parameter $\alpha$ of unity when said correlation is in said manual or second automatic modes, the value of $\alpha$ when said correlation is in said first automatic mode being unity when $4T_{scan} \geq \tau_n$ and 1/2 unity when $\tau_n$ is greater than $4T_{scan}$.